INVENTOR.
JAMES G. ALLEMANN,
BY
McMorrow, Berman + Davidson
ATTORNEYS.

Feb. 16, 1960  J. G. ALLEMANN  2,925,104
COMBINATION CHAIN-AND-CIRCULAR-SAW PORTABLE POWER SAW UNIT
Filed July 2, 1959  3 Sheets-Sheet 3

INVENTOR.
JAMES G. ALLEMANN,
BY
McMorrow, Berman + Davidson
ATTORNEYS.

United States Patent Office 2,925,104
Patented Feb. 16, 1960

2,925,104

COMBINATION CHAIN-AND-CIRCULAR-SAW PORTABLE POWER SAW UNIT

James G. Allemann, Santa Ana, Calif.

Application July 2, 1959, Serial No. 824,714

5 Claims. (Cl. 143—1)

The present invention relates to a portable power saw unit for use in cutting notches in roof rafters.

In the framing of a wooden building, a generally acceptable practice is to cut a right angled notch in the lower end portion of each roof rafter for accommodating the rafter plate. Hand sawing of the notch in each rafter is tedious and time-consuming and when a portable power saw is employed, usually only one side of the notch may be cut due to the limited depth of cut permitted by the circular saw blade. The longer cut has to be hand-sawed and it is seen therefore that the employment of a power hand saw expedites only slightly the cutting of the notches in the rafters.

An object of the present invention is to provide a portable power saw unit for cutting in a single operation the notches in a plurality of roof rafters.

Another object of the present invention is to provide a portable power saw unit for cutting the notches in roof rafters which is adjustable for notches of various depths with ease and facility.

A further object of the present invention is to provide a portable power saw unit for cutting notches in roof rafters which is simple in structure, sturdily constructed, one economically feasible, and one which is highly effective in action.

These and other objects and advantages of the present invention will be fully apparent from the following description when taken in conjunction with the annexed drawings, in which.

Figure 1:
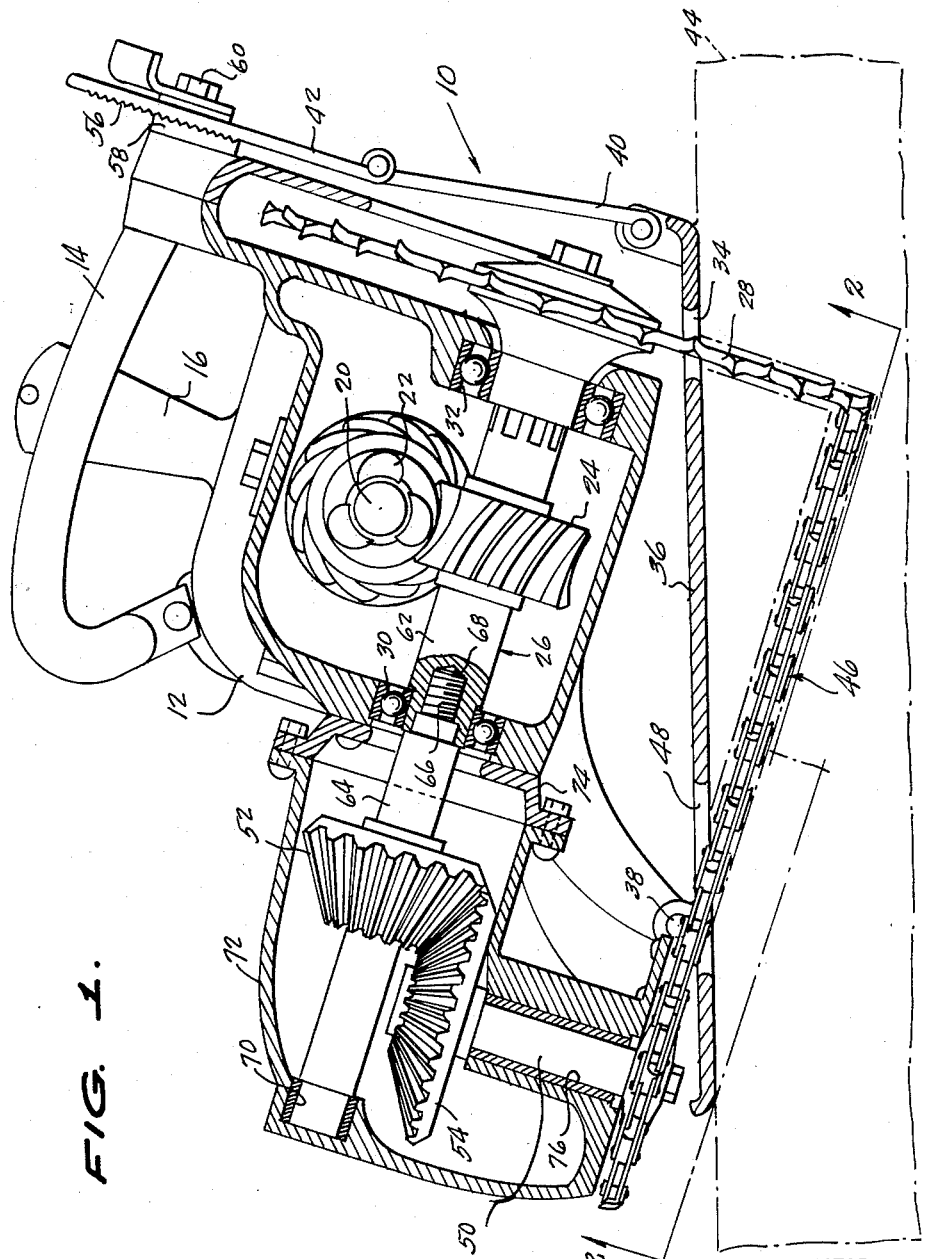
Figure 1 is a sectional view of the portable power saw unit of the present invention as viewed from the front end, the dotted line showing indicating a work piece to be cut.
Figure 2:
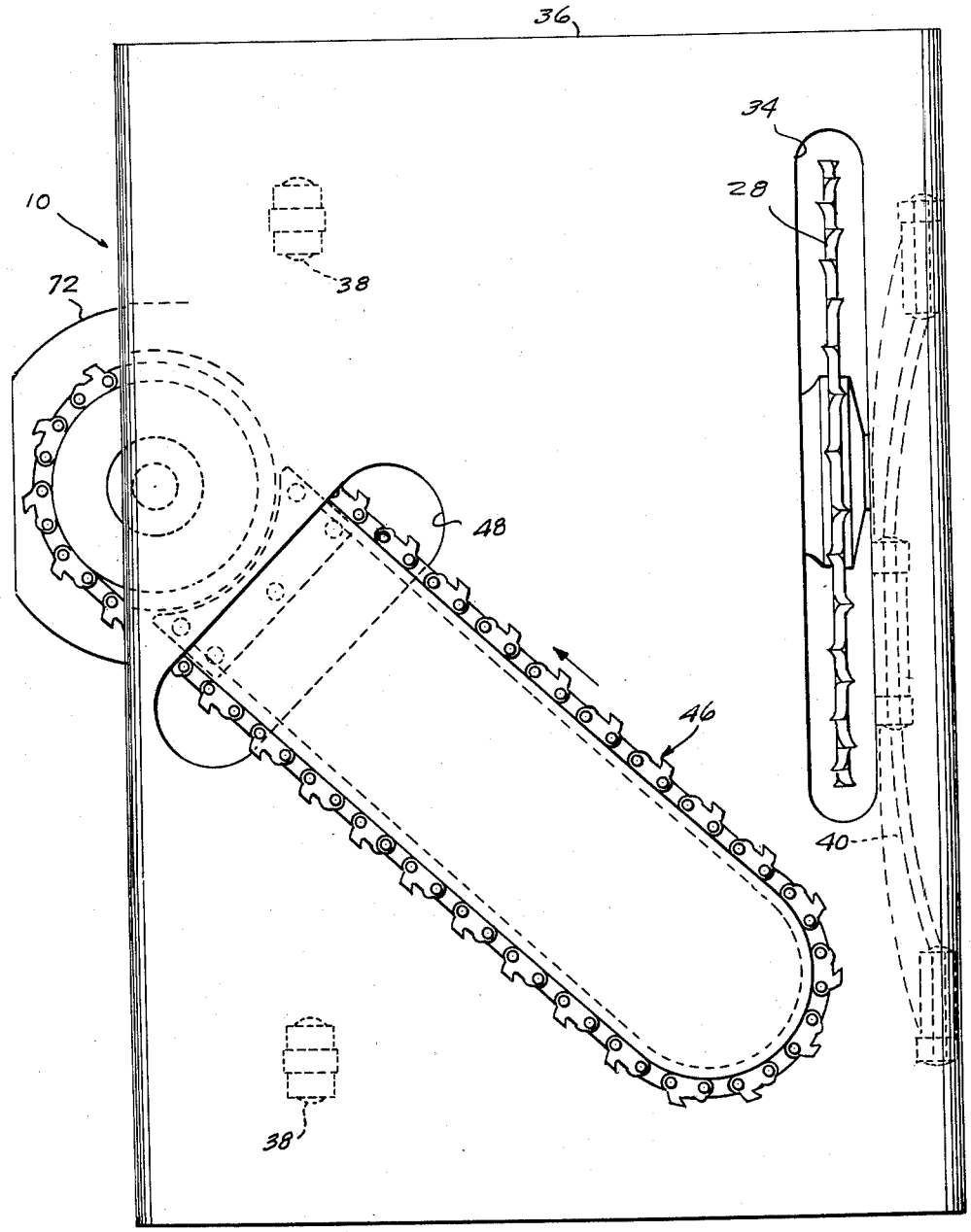
Figure 2 is a view taken on the line 2—2 of Figure 1.

Referring in greater detail to the drawings in which like numerals indicate like parts throughout the several views, the portable power saw unit according to the present invention is designated generally by the reference numeral 10 and includes a housing 12 having handles 14 and 16 exteriorly thereof. A motor casing 18 has one end contiguous with one side of the housing 12 and the motor shaft 20 projects into the housing 12 and carries on its projecting end portion a main drive gear 22.

The drive gear 22 is in mesh with a gear 24 mounted on an intermediate portion of a driven shaft 26 journaled in the housing 12.

A circular saw 28, of conventional construction, is carried on one end of the driven shaft 26. Bearing assemblies 30 and 32 support the driven shaft 26 in the housing 12. A portion of the periphery of the saw 28 projects below the housing 12 through an aperture 34 provided in a guide shoe 36 which is connected to the housing 12 inwardly of one side edge by a pivot pin 38 and at the other end by link members 40 and 42 for movement toward and away from the housing 12.

Figure 3:
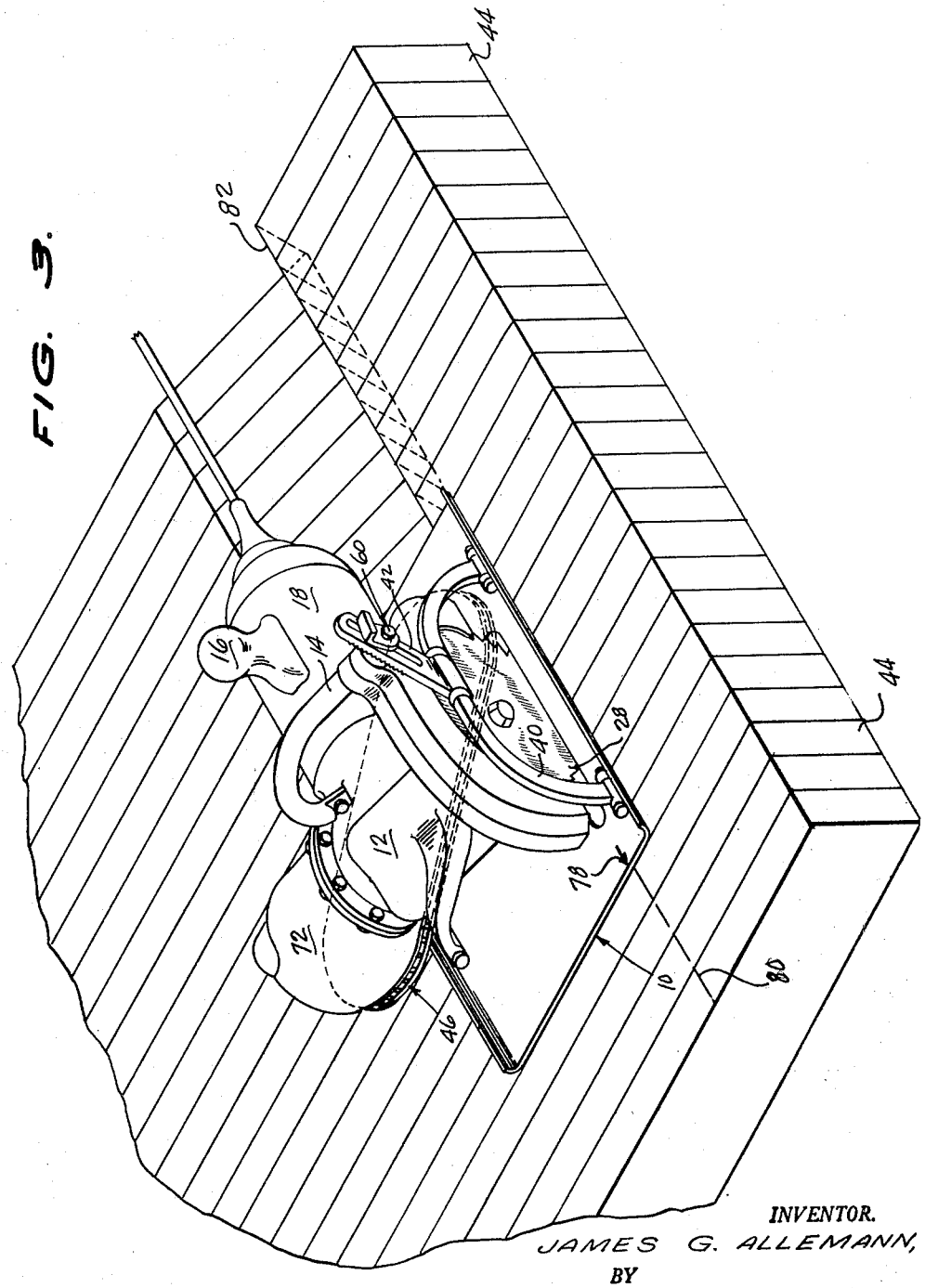
Figure 3 is an isometric view showing the portable power saw unit according to the present invention in operation cutting notches in a plurality of roof rafters arranged in side by side abutting relation.

The guide shoe 36 constitutes a means on the housing 12 for supporting the housing 12 on a workpiece such as the rafters shown in Figure 3 and designated by the numerals 44.

A chain saw assembly 46 is positioned on one side of the circular saw 28 and has a peripheral portion projecting through another aperture 48 provided in the guide shoe 36. The chain saw assembly 46 is operatively connected to the projecting end portion of an auxiliary shaft 50 which is positioned within the housing 12 perpendicularly with respect to the driven shaft 26 and having the end remote from the chain saw assembly 46 adjacent to and spaced from the other end of the driven shaft 26.

Cooperating gear means is provided on the end of the auxiliary shaft 50 adjacent the shaft 26 and on the portion of the shaft 26 inwardly of the end remote from the blade or circular saw 28 for effecting the rotary movement of the shaft 50 responsive to rotation of the shaft 26. This means consists in a first bevel gear 52 mounted on the shaft 26 and a second bevel gear 54 mounted on the shaft 50 in mesh with the bevel gear 52.

The upper end portion of the link member 42 is provided with serrations, as at 56, matching the serrations on a washer 58 circumposed about the shank of a bolt 60, the loosening and tightening of the bolt 60 permitting the adjustment of the link member 42 upwardly and downwardly with respect to the washer 58. This in turn adjusts the guide shoe 36 toward and away from the housing 12 so as to change the depth of cut of the circular saw 28 and the chain saw assembly 46.

Preferably, the shaft 26 is fabricated of a first section 62 and a second section 64 having a threaded reduced portion 66 received in a threaded socket provided in the adjacent end of the section 62, the socket being designated by the reference numeral 68 in Figure 1.

The end of the shaft section 64 remote from the section 62 is supported in a sleeve bearing 70 supported in an auxiliary housing 72 which is bolted to a cup element 74 secured to the adjacent end of the housing 12.

The shaft 50 is supported in another sleeve bearing 76 in the housing 72 and suitable provision is made for lubrication of the sleeve bearings 70 and 76, although not here illustrated nor described as not being a part of the present invention.

In a practical form of the power saw unit of the present invention, an arrow is stamped or printed on the upper face of the guide shoe 36, as at 78 in Figure 3, for indicating to the user the position of the saw unit 10 with reference to a guide line 80 inscribed upon the workpieces or rafters 44.

In use, the user of the saw unit 10 holds the same by the handles 14 and 16 and propels it across the rafters 44 from right to left in Figure 3 with the guide shoe 36 forming the means on the housing 12 for supporting the housing 12 upon the rafters 44. As the saw unit 10 is guided across the rafters 44 with the arrow 78 in alignment with the guide line 80, the circular saw 28 cuts one wall of the notch to be formed and the following chain saw assembly 46 simultaneously cuts the other wall of the notch, such notch being designated in Figure 3 by the reference numeral 82.

It will be seen therefore that the saw unit 10 of the present invention expedites the cutting of notches in rafters for the accommodation of the rafter plates. When desired, the auxiliary housing 72 with the shaft section 64 may be detached from the housing 12 and the shaft section 62 and the saw unit 10 of the present invention may be employed as a portable circular saw in the conventional manner.

What is claimed is:

1. In a portable power saw unit, a housing, means on said housing for supporting the housing upon a workpiece, a driven shaft in said housing, a circular saw on said shaft and having a peripheral portion projecting through and below said means, a chain saw assembly positioned on one side of said circular saw and having a peripheral portion projecting through and below said means, and means connecting said chain saw assembly to said driven shaft for movement with the latter, the peripheral portions of said circular saw and of said chain saw assembly projecting below said means being operable to simultaneously form an angle notch in a workpiece when said housing supporting means is supported upon said workpiece and moved thereover.

2. In a portable power saw unit, a housing, means embodying a guide shoe for supporting the housing upon a workpiece, said shoe being provided with at least two spaced apertures and connected to said housing for movement toward and away from said housing, a driven shaft in said housing, a circular saw on said shaft and having a peripheral portion projecting through one of said apertures, a chain saw assembly positioned on one side of said circular saw and having a peripheral portion projecting through the other of said apertures, and means connecting said chain saw assembly to said driven shaft for movement with the latter, the peripheral portions of said circular saw and of said chain saw assembly projecting through said apertures being operable to simultaneously form an angle notch in a workpiece when said housing supporting means is supported upon said workpiece and moved thereover.

3. In a portable power saw unit, a housing, means on said housing for supporting the housing upon a workpiece, a driven shaft in said housing, a circular saw on one end of said shaft and having a peripheral portion projecting through and below said means, an auxiliary shaft positioned within said housing and having one end adjacent the other end of said driven shaft and having the other end remote from said driven shaft, a chain saw assembly operatively connected to the other end of said auxiliary shaft and having a peripheral portion projecting below said means, cooperating gear means on said one end of said auxiliary shaft and on said driven shaft adjacent said driven shaft other end for effecting the rotation of said auxiliary shaft with said driven shaft, the peripheral portions of said circular saw and of said chain saw assembly projecting below said means being operable to simultaneously form an angle notch in a workpiece when said housing supporting means is supported upon said workpiece and moved thereover.

4. In a portable power saw unit, a housing, means embodying a guide shoe for supporting the housing upon a workpiece, said shoe being provided with at least two spaced apertures and connected to said housing for movement toward and away from said housing, a driven shaft in said housing, a circular saw on one end of said shaft and having a peripheral portion projecting through one of said apertures, an auxiliary shaft positioned within said housing and having one end adjacent the other end of said driven shaft and having the other end remote from said driven shaft, a chain saw assembly operatively connected to the other end of said auxiliary shaft having a peripheral portion projecting through the other of said apertures, cooperating gear means on said one end of said auxiliary shaft and on said driven shaft adjacent said driven shaft other end for effecting the rotation of said auxiliary shaft with said driven shaft, the peripheral portions of said circular saw and of said chain saw assembly projecting through said apertures being operable to simultaneously form an angle notch in a workpiece when said guide shoe is supported upon said workpiece and moved thereover.

5. In a portable power saw unit, a housing, means embodying a guide shoe for supporting the housing upon a workpiece, said shoe being provided with at least two spaced apertures and connected to said housing for movement toward and away from said housing, a driven shaft in said housing, a circular saw on one end of said shaft and having a peripheral portion projecting through one of said apertures, an auxiliary shaft positioned within said housing perpendicularly with respect to said driven shaft and having one end adjacent the other end of said driven shaft and having the other end remote from said driven shaft, a chain saw assembly operatively connected to the other end of said auxiliary shaft having a peripheral portion projecting through the other of said apertures, cooperating gear means on said one end of said auxiliary shaft and on said driven shaft adjacent said driven shaft other end for effecting the rotation of said auxiliary shaft with said driven shaft, the peripheral portions of said circular saw and of said chain saw assembly projecting through said apertures being operable to simultaneously form an angle notch in a workpiece when said guide shoe is supported upon said workpiece and moved thereover.

References Cited in the file of this patent

UNITED STATES PATENTS

| | | |
|---|---|---|
| 1,765,987 | Marion | June 24, 1930 |
| 2,609,848 | Schneider | Sept. 9, 1952 |
| 2,756,784 | Cherem | July 31, 1956 |
| 2,839,097 | Siria | June 17, 1958 |